(12) United States Patent
Shih

(10) Patent No.: US 7,844,165 B2
(45) Date of Patent: Nov. 30, 2010

(54) METHOD AND DEVICE FOR ADAPTIVELY ESTIMATING REMAINING VIDEO LENGTH IN REAL TIME FOR USER'S CONVENIENCE WHILE VIEWING AT LEAST ONE PROGRAM

(75) Inventor: Hsuan-Huei Shih, Taipei (TW)

(73) Assignee: MAVs Lab. Inc., Taipei (TW)

( * ) Notice: Subject to any disclaimer, the term of this patent is extended or adjusted under 35 U.S.C. 154(b) by 1105 days.

(21) Appl. No.: 11/533,773

(22) Filed: Sep. 21, 2006

(65) Prior Publication Data
US 2008/0075422 A1    Mar. 27, 2008

(51) Int. Cl.
*H04N 5/91* (2006.01)
(52) U.S. Cl. .......................................... 386/83; 386/95
(58) Field of Classification Search ................... 386/46, 386/83, 95
See application file for complete search history.

(56) References Cited

U.S. PATENT DOCUMENTS 6,157,772 A * 12/2000 Kim ............................. 386/83
6,678,462 B1 * 1/2004 Chihara ....................... 386/83

* cited by examiner

*Primary Examiner*—Huy T Nguyen
(74) *Attorney, Agent, or Firm*—Winston Hsu; Scott Margo

(57) ABSTRACT

A method for adaptively estimating a remaining video length in real time for a user's convenience while viewing at least one program, includes calculating an average value of the viewed length of each viewed segment of the at least one program, and calculating the number of index points corresponding to remaining segments to derive a remaining number of index points. The method further includes multiplying the average value by the remaining number to estimate the remaining video length.

20 Claims, 3 Drawing Sheets

METHOD AND DEVICE FOR ADAPTIVELY ESTIMATING REMAINING VIDEO LENGTH IN REAL TIME FOR USER'S CONVENIENCE WHILE VIEWING AT LEAST ONE PROGRAM

BACKGROUND OF THE INVENTION

1. Field of the Invention

The present invention relates to video playback devices, and more particularly, to methods and devices for adaptively estimating a remaining video length in real time for a user's convenience while viewing at least one program.

2. Description of the Prior Art

A video playback device such as a digital versatile disc (DVD) player is capable of displaying an elapsed time and a remaining time of a DVD being played. The elapsed time tells the user how much time has already been spent on the program recorded on the DVD, while the remaining time tells the user how much more time he or she will spend on the DVD before finishing viewing the recorded program, so the user may have proper schedule control according to the elapsed time and/or the remaining time displayed on a display module of the DVD player, where the display module typically comprises a plurality of seven-segment light emitting diodes (seven-segment LEDs) for respectively displaying digits of the elapsed time or the remaining time.

Regarding an indexed program, for example a sports program with indexes respectively indicating highlight segments therein, a user may be informed of a so-called elapsed time and even a so-called remaining time of the sports program. Please note that as the sports program is a highlight version of one or more games for the user, it is supposed that the playback of the sports program is nonlinear most of the time. More specifically, the sports program is typically played with some segments being skipped according to the user's preferences. For example, during the first few seconds of each of the segments that the user is not interested in, the segment is skipped according to the user's wishes. As a result, the so-called elapsed time is not a real elapsed time and the so-called remaining time is not a real remaining time. Therefore, the user has to watch the sports program without assurance of properly controlling his or her schedule.

SUMMARY OF THE INVENTION

It is an objective of the claimed invention to provide methods and devices for adaptively estimating a remaining video length in real time for a user's convenience while viewing at least one program.

According to one embodiment of the claimed invention, a method for adaptively estimating a remaining video length in real time for a user's convenience while viewing at least one program is disclosed. The method comprises: providing a plurality of index points for a plurality of segments of the at least one program respectively; calculating an average value of the viewed length of each viewed segment of the at least one program, and calculating the number of index points corresponding to remaining segments to derive a remaining number of index points; and multiplying the average value by the remaining number to estimate the remaining video length.

According to one embodiment of the claimed invention, a method for adaptively estimating a remaining video length in real time for a user's convenience while viewing at least one program is disclosed. A plurality of index points are provided for a plurality of segments of the at least one program respectively. The method comprises: calculating an average value of the viewed length of each viewed segment of the at least one program, and calculating the number of index points corresponding to remaining segments to derive a remaining number of index points; and multiplying the average value by the remaining number to estimate the remaining video length.

According to one embodiment of the claimed invention, a device for adaptively estimating a remaining video length in real time for a user's convenience while viewing at least one program is disclosed. The device comprises: a processing circuit for calculating an average value of the viewed length of each viewed segment of the at least one program, calculating the number of index points corresponding to remaining segments to derive a remaining number of index points, and multiplying the average value by the remaining number to estimate the remaining video length, where a plurality of index points are provided for a plurality of segments of the at least one program respectively; and a display control circuit, coupled to the processing circuit, for controlling the display of the remaining video length.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
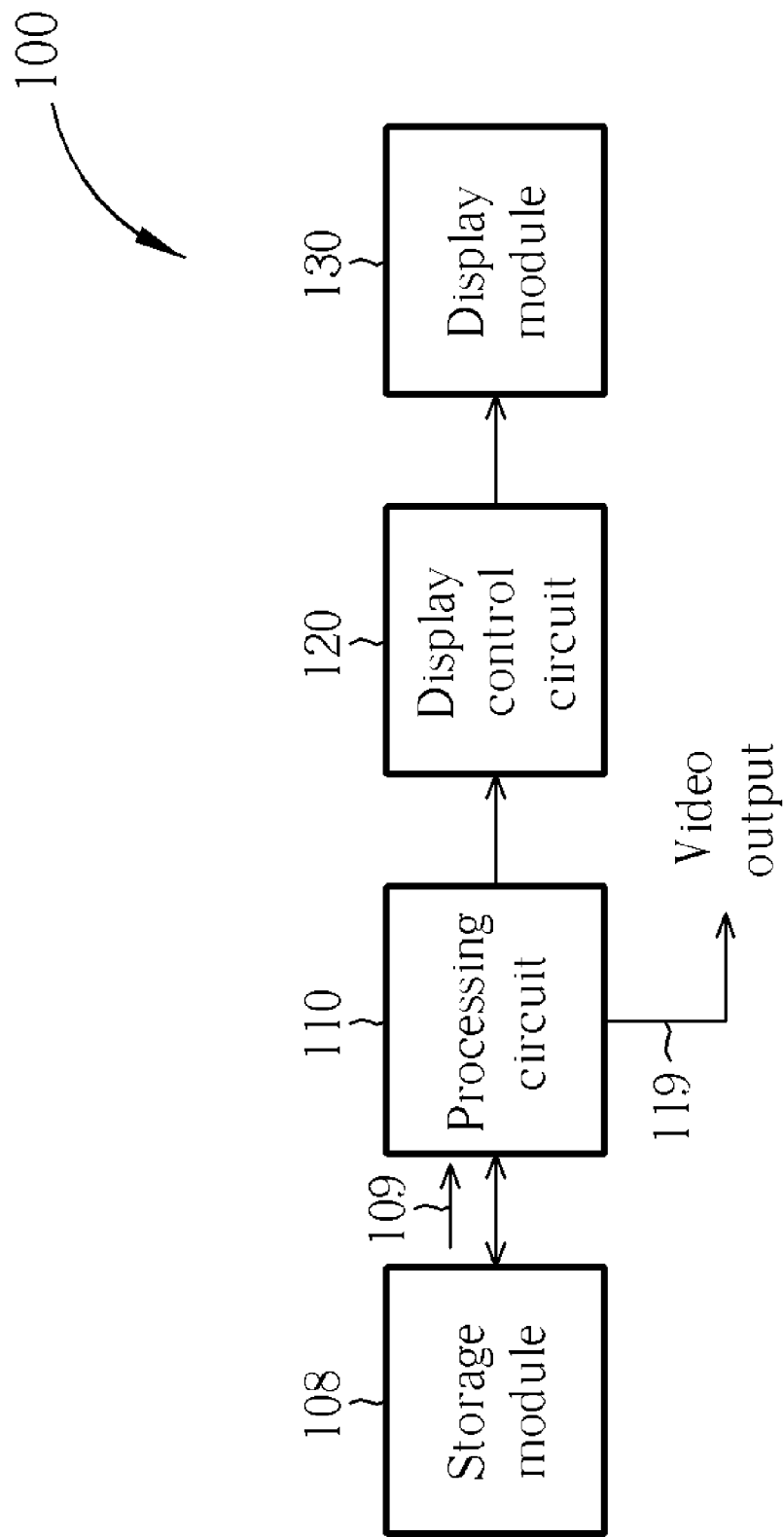
FIG. 1 is a diagram of a device for adaptively estimating a remaining video length in real time for a user's convenience while viewing at least one program according to one embodiment of the present invention.
Figure 2:
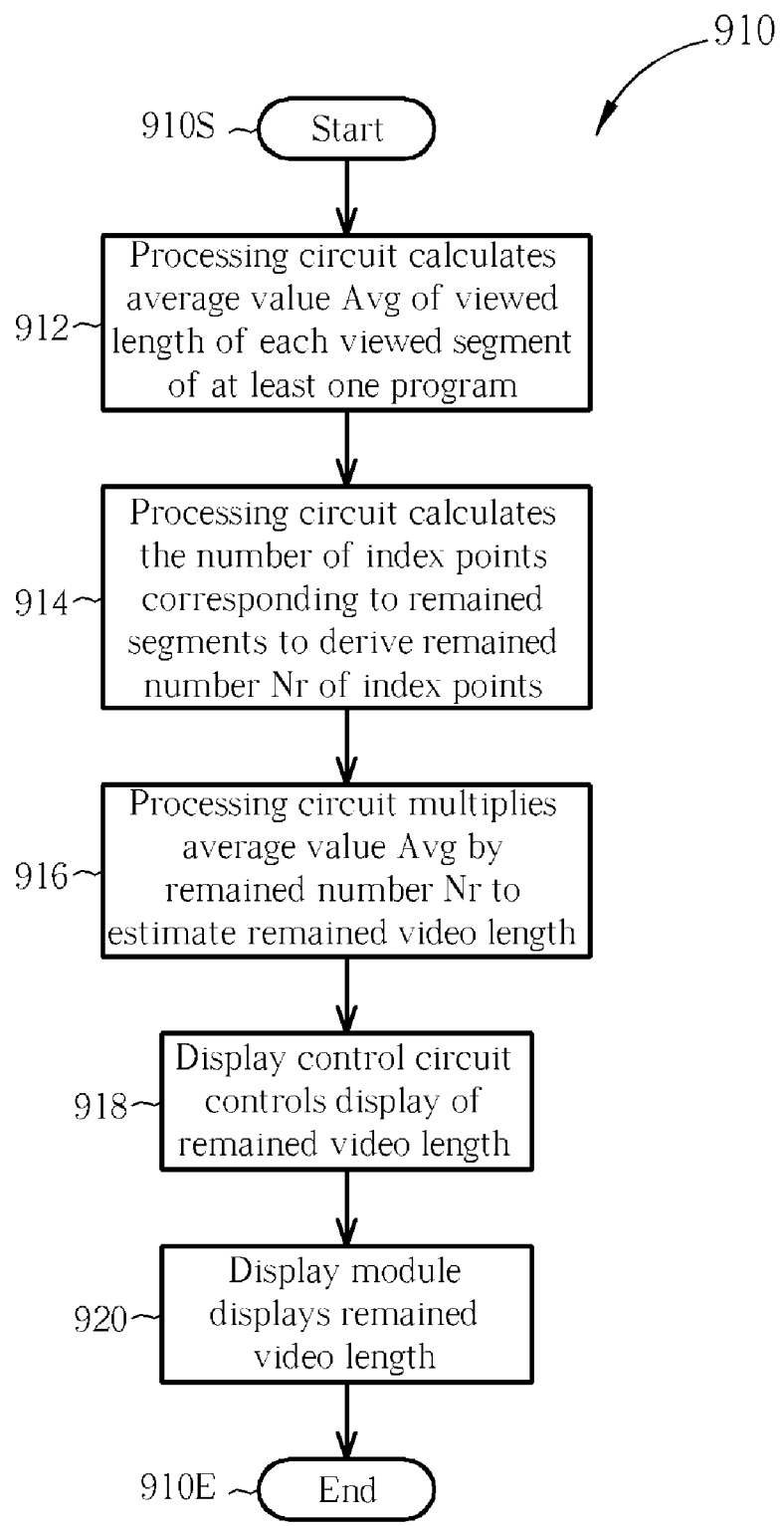
FIG. 2 is a flowchart of a method for adaptively estimating a remaining video length in real time for a user's convenience while viewing at least one program according to one embodiment of the present invention.

Please refer to FIG. 1 and FIG. 2. FIG. 1 is a diagram of a device 100 for adaptively estimating a remaining video length in real time for a user's convenience while viewing at least one program according to one embodiment of the present invention. FIG. 2 is a flowchart of a method 910 for adaptively estimating a remaining video length in real time for a user's convenience while viewing at least one program according to one embodiment of the present invention. The method 910 shown in FIG. 2 can be implemented with the embodiment shown in FIG. 1.

The device 100 comprises a storage module 108, a processing circuit 110, a display control circuit 120, and a display module 130. In this embodiment, the device 100 is a video playback device, and the processing circuit 110 is a video processor that is capable of decoding encoded data 109 of the at least one program to generate decoded data 119 for playback of the at least one program, where the storage module 108 provides the encoded data 109 of the at least one program for the processing circuit 110. According to an implementation choice of this embodiment, the storage module 108 can be a hard disc (HD) for storing the at least one program. According to another implementation choice of this embodiment, the storage module 108 can be a disc accessing module for accessing a digital versatile disc (DVD) storing the at least one program.

According to this embodiment, if the at least one program is indexed, this means a plurality of index points are provided for a plurality of segments of the program, respectively. For example, the program is a sports program with each segment indicated by one of these index points, so the processing circuit 110 may decode the encoded data 109, starting from the beginning portion of one segment being played. In addition, if the at least one program is not indexed, the processing circuit 110 is capable of indexing the program. For example, the processing circuit 110 may respectively provide the plurality of index points for the plurality of segments of the at least one program according to the user's control. This means the program can be indexed manually. For another example, the processing circuit 110 may respectively provide the plurality of index points for the plurality of segments of the program according to the contents of the program. This means the program can be indexed automatically by the processing circuit 110.

As long as the at least one program is indexed (no matter whether the program is originally indexed or indexed by the processing circuit 110), the processing circuit 110 calculates an average value Avg of the viewed length of each viewed segment of the at least one program, as shown in Step 912. More particularly in this embodiment, the viewed length is measured in units of time (e.g. seconds), and the processing circuit 110 calculates the average value Avg of the viewed length of each viewed segment of the at least one program in units of time. In addition, the processing circuit 110 calculates the number of index points corresponding to remaining segments to derive a remaining number Nr of index points, as shown in Step 914. More particularly, as in this embodiment, each of the segments has one index point, the remaining number Nr is substantially the number of index points. Accordingly, the processing circuit 110 multiplies the average value Avg by the remaining number Nr to estimate the remaining video length mentioned above, as shown in Step 916. Here, the average value Avg and the remaining number Nr are calculated more than once and, more particularly, are calculated periodically. As a result, the processing circuit 110 may multiply the latest average value Avg by the latest remaining number Nr to update the remaining video length.

According to this embodiment, the display control circuit 120 controls the display of the remaining video length mentioned above, as shown in Step 918. In addition, the display module 130 comprises a plurality of seven-segment LEDs. As shown in Step 920, the display module 130 displays the remaining video length, which is calculated by the processing circuit 110, for the user's convenience while viewing the at least one program, where the format of the remaining video length that is displayed by the display module 130 is substantially the remaining time. As a result, the user may have reassurance of properly controlling his or her schedule.

According to a variation of this embodiment, the viewed length is measured in units of video frame number, and the processing circuit 110 calculates the average value Avg of the viewed length of each viewed segment of the at least one program in units of video frame number.

According to another variation of this embodiment, the display control circuit 120 is embedded in the processing circuit 110, where the processing circuit 110 is implemented by utilizing a single chip.

Yet according to another variation of this embodiment, the storage module 108 may comprises both the HD and the disc accessing module mentioned above.

Figure 3:
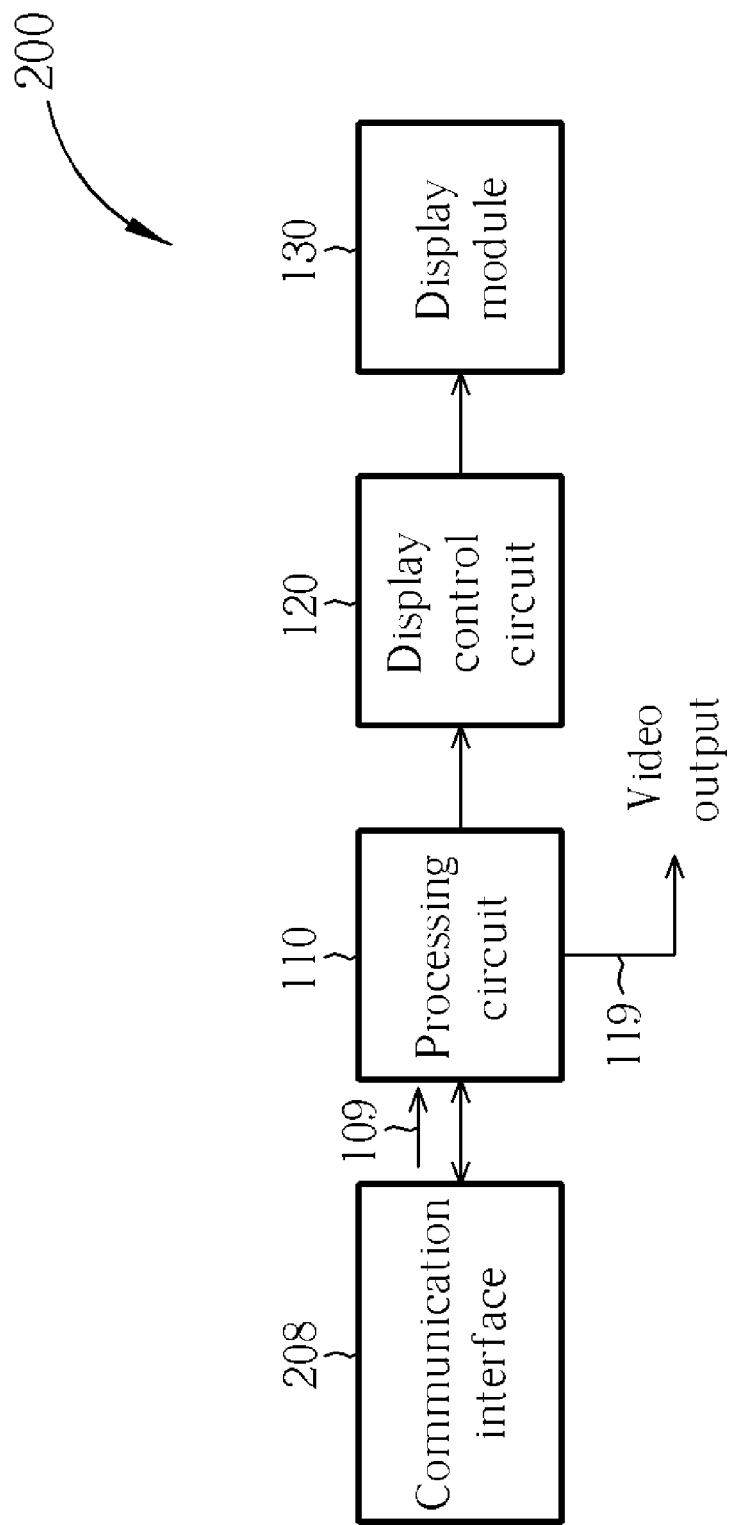
FIG. 3 is a diagram of a device for adaptively estimating a remaining video length in real time for a user's convenience while viewing at least one program according to one embodiment of the present invention.

FIG. 3 is a diagram of a device 200 for adaptively estimating a remaining video length in real time for a user's convenience while viewing at least one program according to one embodiment of the present invention, where this embodiment is also a variation of the embodiment shown in FIG. 1. As shown in FIG. 3, the device 200 comprises a communication interface 208, which replaces the storage module 108 mentioned above. According to an implementation choice of this embodiment, the device 200 can be a setup box with the communication interface 208 coupled to a cable for accessing programs from a service provider. According to another implementation choice of this embodiment, the device 200 can be a personal digital assistant (PDA) with the communication interface 208 being a wireless interface for accessing programs from a wireless internet access point, where the display module 130 can be a liquid crystal display (LCD) panel of the PDA. Yet according to another implementation choice of this embodiment, the device 200 can be a mobile phone with the communication interface 208 being a wireless interface for accessing programs via a telecommunication system from a service provider, where the display module 130 can be an LCD panel or an organic light emitting diode (OLED) display panel of the mobile phone.

In contrast to the prior art, the present invention method and device may correctly and adaptively estimate the remaining video length in real time, so the user may have reassurance of properly controlling his or her schedule.

It is another advantage of the present invention that once the user is informed of the remaining time corresponding to the viewing behavior, the user is conscious of how much more time he or she may spend on viewing the indexed program(s).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for adaptively estimating a remaining video length in real time for a user's convenience while viewing at least one program, the method comprising:

providing a plurality of index points for a plurality of segments of the at least one program respectively;

calculating an average value of the viewed length of each viewed segment of the at least one program, and calculating the number of index points corresponding to remaining segments to derive a remaining number of index points; and multiplying the average value by the remaining number to estimate the remaining video length.

2. The method of claim 1, wherein the viewed length is measured in units of time, and the step of calculating the average value of the viewed length of each viewed segment of the at least one program further comprises:

calculating the average value of the viewed length of each viewed segment of the at least one program in units of time.

3. The method of claim 1, wherein the viewed length is measured in units of video frame number, and the step of calculating the average value of the viewed length of each viewed segment of the at least one program further comprises:

calculating the average value of the viewed length of each viewed segment of the at least one program in units of video frame number.

4. The method of claim 1, wherein the average value and the remaining number are calculated more than once, and the step of multiplying the average value by the remaining number to estimate the remaining video length further comprises:

multiplying the latest average value by the latest remaining number to update the remaining video length.

5. The method of claim 4, wherein the remaining video length is estimated in units of time, and the method further comprises:

displaying the remaining video length for the user's convenience while viewing the at least one program.

6. A method for adaptively estimating a remaining video length in real time for a user's convenience while viewing at least one program, a plurality of index points being provided for a plurality of segments of the at least one program respectively, the method comprising:

calculating an average value of the viewed length of each viewed segment of the at least one program, and calculating the number of index points corresponding to remaining segments to derive a remaining number of index points; and multiplying the average value by the remaining number to estimate the remaining video length.

7. The method of claim 6, wherein the viewed length is measured in units of time, and the step of calculating the average value of the viewed length of each viewed segment of the at least one program further comprises:

calculating the average value of the viewed length of each viewed segment of the at least one program in units of time.

8. The method of claim 6, wherein the viewed length is measured in units of video frame number, and the step of calculating the average value of the viewed length of each viewed segment of the at least one program further comprises:

calculating the average value of the viewed length of each viewed segment of the at least one program in units of video frame number.

9. The method of claim 6, wherein the average value and the remaining number are calculated more than once, and the step of multiplying the average value by the remaining number to estimate the remaining video length further comprises:

multiplying the latest average value by the latest remaining number to update the remaining video length.

10. The method of claim 9, wherein the remaining video length is estimated in units of time, and the method further comprises:

displaying the remaining video length for the user's convenience while viewing the at least one program.

11. A device for adaptively estimating a remaining video length in real time for a user's convenience while viewing at least one program, the device comprising:

a processing circuit for calculating an average value of the viewed length of each viewed segment of the at least one program, calculating the number of index points corresponding to remaining segments to derive a remaining number of index points, and multiplying the average value by the remaining number to estimate the remaining video length, wherein a plurality of index points are provided for a plurality of segments of the at least one program respectively; and a display control circuit, coupled to the processing circuit, for controlling the display of the remaining video length.

12. The device of claim 11, wherein the viewed length is measured in units of time, and the processing circuit calculates the average value of the viewed length of each viewed segment of the at least one program in units of time.

13. The device of claim 11, wherein the viewed length is measured in units of video frame number, and the processing circuit calculates the average value of the viewed length of each viewed segment of the at least one program in units of video frame number.

14. The device of claim 11, wherein the average value and the remaining number are calculated more than once, and the processing circuit multiplies the latest average value by the latest remaining number to update the remaining video length.

15. The device of claim 14, wherein the remaining video length is estimated in units of time, and the device further comprises:

a display module, coupled to the display control circuit, for displaying the remaining video length for the user's convenience while viewing the at least one program.

16. The device of claim 11, wherein the display control circuit is embedded in the processing circuit.

17. The device of claim 11, wherein the processing circuit is a video processor that is capable of decoding encoded data of the at least one program to generate decoded data for playback of the at least one program.

18. The device of claim 17, wherein the device is a video playback device, and the device further comprises:

a storage module and/or a communication interface, coupled to the processing circuit, for providing the encoded data of the at least one program for the processing circuit.

19. The device of claim 11, wherein the processing circuit is capable of respectively providing the plurality of index points for the plurality of segments of the at least one program according to the contents of the at least one program.

20. The device of claim 11, wherein the processing circuit is capable of respectively providing the plurality of index points for the plurality of segments of the at least one program according to the user's control.

* * * * *